(12) United States Patent
Kumar

(10) Patent No.: US 12,348,249 B2
(45) Date of Patent: Jul. 1, 2025

(54) SPREAD SPECTRUM ADJUSTMENT FOR AN LC CIRCUIT

(71) Applicant: Microchip Technology Incorporated, Chandler, AZ (US)

(72) Inventor: Ajay Kumar, Phoenix, AZ (US)

(73) Assignee: Microchip Technology Incorporated, Chandler, AZ (US)

(*) Notice: Subject to any disclaimer, the term of this patent is extended or adjusted under 35 U.S.C. 154(b) by 512 days.

(21) Appl. No.: 17/714,586

(22) Filed: Apr. 6, 2022

(65) Prior Publication Data

US 2022/0352912 A1    Nov. 3, 2022

Related U.S. Application Data

(60) Provisional application No. 63/181,651, filed on Apr. 29, 2021.

(51) Int. Cl.
*H04B 1/04*    (2006.01)
*H04B 1/69*    (2011.01)

(52) U.S. Cl.
CPC ................. *H04B 1/04* (2013.01); *H04B 1/69* (2013.01); *H04B 2001/0416* (2013.01)

(58) Field of Classification Search
CPC ....................................................... H04B 1/04
See application file for complete search history.

(56) References Cited

U.S. PATENT DOCUMENTS

| 7,583,154 | B1 | 9/2009 | Kizziar | ........................... 331/65 |
| 2003/0161385 | A1* | 8/2003 | Chang | .................. H04B 1/7097 |
| | | | | 375/E1.036 |
| 2008/0100350 | A1 | 5/2008 | Pernia et al. | .................. 327/114 |
| 2013/0332025 | A1* | 12/2013 | Ziarno | ............... G05B 23/0213 |
| | | | | 701/33.4 |

FOREIGN PATENT DOCUMENTS

WO    2020/159477 A1    8/2020    .......... H03K 17/945

OTHER PUBLICATIONS

International Search Report and Written Opinion, Application No. PCT/US2022/026967, 20 pages, Oct. 17, 2022.
Partial International Search Report, Application No. PCT/US2022/026967, 15 pages, Aug. 23, 2022.

* cited by examiner

*Primary Examiner* — Hsinchun Liao
(74) *Attorney, Agent, or Firm* — SLAYDEN GRUBERT BEARD PLLC

(57) ABSTRACT

A controller and a method is provided for controlling a capacitance of an LC circuit having a circuit frequency including, a variable capacitor to couple with an external inductor as part of an LC circuit, a target value, a spread spectrum function to generate an adjustment value, and a circuit to poll the target value, call the spread spectrum function, and set a capacitance of the variable capacitor based on the sum of the target value and the adjustment value.

19 Claims, 5 Drawing Sheets

SPREAD SPECTRUM ADJUSTMENT FOR AN LC CIRCUIT

PRIORITY

The present application claims priority to U.S. Provisional Patent Application No. 63/181,651 filed Apr. 29, 2021, the contents of which are hereby incorporated in their entirety.

FIELD OF THE INVENTION

The present disclosure relates to electronics and, more particularly, to a spread spectrum adjustment for an LC circuit to address electromagnetic interference (EMI).

BACKGROUND

Position and proximity systems may use an arrangement of inductive coils to determine the relative position or proximity of an object, or target, to the coils. For example, when a coil of wire is placed in a changing magnetic field, a voltage will be induced at ends of the coil of wire. In a predictably changing magnetic field, the induced voltage will be predictable (based on factors including the area of the coil affected by the magnetic field and the degree of change of the magnetic field). It is possible to disturb a predictably changing magnetic field and measure a resulting change in the voltage induced in the coil of wire. Further, it is possible to create a sensor that measures movement of a disturber of a predictably changing magnetic field based on a change in a voltage induced in one or more coils of wire. Some position/proximity systems include sense coils arranged on and/or in a support structure (e.g., sense coils as conductive lines in a printed circuit board (PCB)).

Relevant sensors may include inductor-capacitor (LC) and resistor-inductor-capacitor (RLC) circuits. These circuits may generate sinusoidal signals based on various inputs, detections, or measurements. Changes in the sinusoidal signals may reflect changes in the inductance, which may in turn be caused by the approach or position of a foreign object such as a finger, stylus, target, disturber, or other body.

Position systems may be implemented in part by components soldered onto printed circuit boards (PCBs). As such, the capacitors of the position system may be soldered onto the PCBs. Moreover, inductors may be formed within layers on top of or inside the PCB itself. The frequency of the LC or RLC circuits formed by these inductors and capacitors may be established according to the capacitance, inductance, impedance, and resistance values of these components and the layout of such components.

Inventors of examples of the present disclosure have discovered that the voltage swings of oscillation signals in some position and proximity sensors may be as large as 6-8 volts, peak-to-peak, which may cause a significant amount of electromagnetic interference (EMI), which may result in a device comprising such a position or proximity sensor to fail to meet required EMI standards. An EMI failure causes extensive requalification testing and design during development of a system. Moreover, many solutions to EMI include modifications to elements on the PCB itself, which may incur additional design, development, and qualification time and costs. Solutions to the PCB itself might incur multiple iterations of design, development, and qualification in EMI labs, which are also limited resources. Examples of the present disclosure may address one or more of these discoveries by the inventors.

SUMMARY

In some examples, a controller is provided for controlling a capacitance of an LC circuit having a circuit frequency including, a variable capacitor to couple with an external inductor as part of an LC circuit, a target value, a spread spectrum function to generate an adjustment value, and a circuit to poll the target value, call the spread spectrum function, and set a capacitance of the variable capacitor based on the sum of the target value and the adjustment value. In certain examples, the spread spectrum function is a random or pseudo random number generator. In certain examples, the controller includes an adjustment circuit including a frequency comparator circuit to compare a frequency of the LC circuit frequency against a reference frequency and adjust the target value based upon the comparison between the LC circuit frequency and the reference frequency. In certain examples, the adjustment circuit increases the target value when the LC circuit frequency is higher than the reference frequency and decreases the target value when the LC circuit frequency is lower than the reference frequency. In certain examples the spread spectrum function is a random or pseudo random number generator. In certain examples, the spread spectrum function is one of: a ramp function, a triangle function, a sawtooth function, and a sinusoidal function. In certain examples, the spread spectrum function is one of: spreading above a setpoint in up-spreading, below a setpoint in down-spreading, and around a setpoint in center-spreading. In certain examples, the LC circuit includes a proximity/position detection sensor.

In some examples, a method is provided for trimming a capacitance including providing a variable capacitance in an integrated circuit coupled to leads for coupling to, and in parallel with, an external inductor as part of an LC circuit, setting a target value for the variable capacitance, on a regular interval, determining an adjustment value from a spread spectrum function, and setting the variable capacitance based on the sum of the target value and the adjustment value. In certain examples, setting the target value includes increasing the target value when the LC circuit frequency is higher than a reference frequency, and decreasing the target value when the LC circuit frequency is lower than the reference frequency. In certain examples, setting the target value terminates after both increasing and decreasing the target value. In certain examples, setting the variable capacitance comprises using the sum of the target value and the adjustment value to select a number of capacitors to combine to form a capacitor with the target capacitance. In certain examples, the spread spectrum function generates a random or pseudo random number in a range such that adding the output of the spread spectrum function to the target value remains within a minimum and a maximum quantum of available variable capacitance. In certain examples, the spread spectrum function is one of: a ramp function, a triangle function, a sawtooth function, and a sinusoidal function. In certain examples, the spread spectrum function is one of: spreading above a setpoint in up-spreading, below a setpoint in down-spreading, and around a setpoint in center-spreading. In certain examples, the LC circuit includes a proximity/position detection sensor.

In some examples, a microcontroller for adjusting a variable capacitor is provided as part of an LC circuit. The microcontroller programmed for comparing an LC circuit frequency of the LC circuit to a reference frequency, increasing a capacitance of the variable capacitor when the LC circuit frequency is higher than the reference frequency, decreasing the capacitance of the variable capacitor when the LC circuit frequency is lower than the reference frequency; and further increase or decrease the capacitance according to a variable input. In certain examples, the variable input is generated by a random or pseudo random number generator. In certain examples, the variable input is generated by a function that varies according to one of: a ramp function, a triangle function, a sawtooth function, and a sinusoidal function. In certain examples, the variable input is generated by a function that varies according to one of: a ramp function, a triangle function, a sawtooth function, and a sinusoidal function.

DETAILED DESCRIPTION

Figure 1:
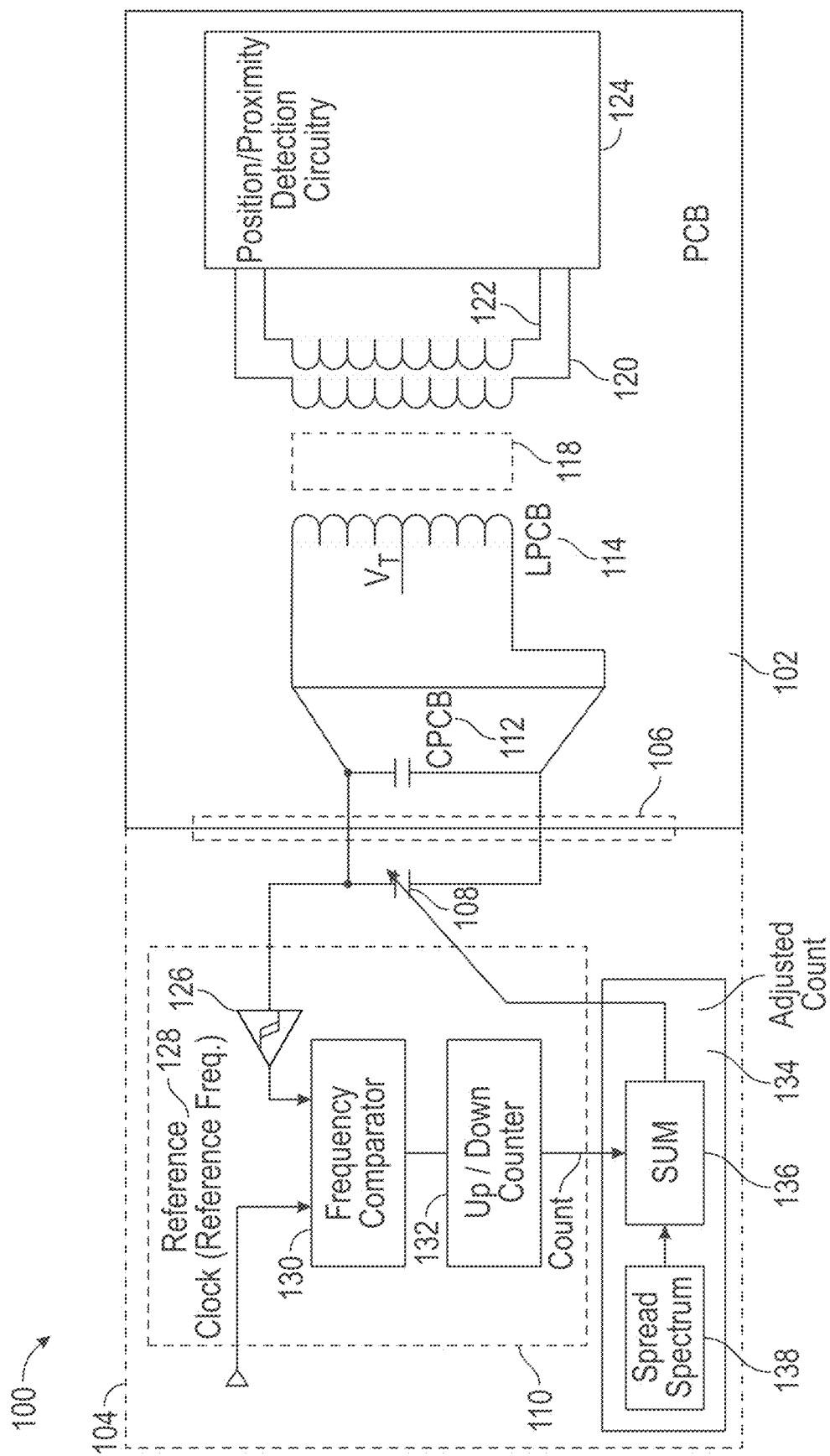
FIG. 1 is an illustration of an application of a spread spectrum adjustment in a PCB-based LC circuit, according to examples of the present disclosure.

FIG. 1 is an illustration of an example application (in system 100) of a spread spectrum adjustment in a PCB-based LC circuit, according to examples of the present disclosure. System 100 may implement, fully or in part, a position or proximity sensing system. Moreover, system 100 may implement a position or proximity sensing system that is implemented fully or in part on a PCB. In addition, system 100 may implement, fully or in part, any suitable system that includes LC or RLC circuits implemented on a PCB. In the present disclosure, LC circuits may be referenced specifically, but the teachings of the present disclosure may also be suitably applied to RLC circuit.

System 100 may include a PCB 102. PCB 102 may include a position or proximity detection system. PCB 102 may include an LC circuit. The LC circuit may include a base frequency or resonant frequency. This may be referred to as the LC frequency. System 100 may include an automatic calibration circuit 104. Automatic calibration circuit 104 may be configured to adjust the LC frequency of the LC circuit of PCB 102. In one example, automatic calibration circuit 104 may be configured to adjust the LC frequency of the LC circuit of PCB 102 to cause a frequency spectrum to result in the LC frequency. This may be performed to reduce the possibility of EMI. Automatic calibration circuit 104 and PCB 102 may be communicatively coupled through an interface 106. Interface 106 may be implemented in any suitable manner, such as through pin connectors. Automatic calibration circuit 104 may be implemented in, for example, a chip, die, processor, application specific integrated circuit, or PCB separate from PCB 102.

Automatic calibration circuit 104 may be configured to adjust the LC frequency based upon any suitable criteria. For example, automatic calibration circuit 104 may be configured to adjust the LC frequency upon start-up, periodically, on-demand, based upon user input, or based upon settings stored in, for example, registers or fuses. Adjustment of the LC frequency may be performed when a foreign body is not expected to be close to or positioning the position or proximity sensing system of PCB 102. In one example, adjustment of the LC frequency to cause a frequency spectrum to result in the LC frequency may be performed continuously.

PCB 102 may include an inductor, denoted as LPCB 114. LPCB 114 may be a primary coil in a contactless position sensor, for example, to measure the rotational position of a high-voltage motor or the linear position of a mechanical actuator. LPCB may be a primary coil in such a sensor. Moreover, PCB 102 may include a capacitor, denoted as CPCB 112. These may be connected together in parallel. Moreover, PCB 102 may include any other suitable components to implement a position or proximity sensing system. For example, PCB 102 may include one or more sensor inductors such as inductors 120, 122, and position/proximity detection circuitry 124. Approach by or position of a foreign body, such as by target 118, may be detected by LPCB 114 in combination with, for example, inductors 120, 122. Inductors 120 and 122 may be sine and cosine coils aligned with the primary coil. A resultant voltage may be recorded at VT. The resultant voltage may take any suitable form to indicate the proximity or position of target 118.

The capacitance of CPCB 112 may be set so as to generally approximate a desired LC frequency for PCB 102. However, as discussed above, manufacturing tolerances may cause an incorrect or inaccurate LC frequency for the given capacitance of CPCB 112. Accordingly, automatic calibration circuit 104 may be configured to adjust the LC frequency of PCB 102, as discussed above. More specifically, automatic calibration circuit 104 may be configured to adjust the LC frequency of PCB 102 by changing an effective capacitance of the LC circuits of PCB 102. For example, automatic calibration circuit 104 may be configured to adjust the effective capacitance of the LC circuits of PCB 102 by adding or subtracting additional capacitance in parallel with CPCB 112. In one example, such additional capacitance may adjust the effective capacitance CPCB 112 within the context of the LC circuit including CPCB 112, and thus the LC frequency of PCB 102. The adding or subtracting of capacitance in parallel with CPCB to adjust the effective capacitance may be referred to as the trimming of effective capacitance of the LC circuit.

Moreover, large voltage swings of the output of the LC circuit may be necessary to measure the position/proximity of target 118 especially with an air gap between target 118 and PCB 102. LPCB may generate a large primary signal and thereby generate unacceptably high electromagnetic emissions. Accordingly, automatic calibration circuit 104 may be configured to adjust the LC frequency of PCB 102 by changing an effective capacitance of the LC circuit of PCB 102 with continuously varying capacitances so as to cause a spectrum of frequency responses in the LC circuit of PCB 102. This may be performed in addition to the trimming of effective capacitance of the LC circuit, or this may be performed alone without trimming the effective capacitance of the LC circuit.

Inductors of PCB 102, such as LPCB 114, may have an inductance within the range of 3-12 µH. The capacitance of capacitor CPCB 112 may have a range of 0.1-5 nF. The LC frequency of the LC circuit of LPCB 114 and CPCB 112 may have a range of 1-6 MHz. The LC frequency of the LC circuit may be expressed as $$f = \frac{1}{2\pi\sqrt{LPCB * CPCB}}$$

It may be desired that the actual frequency of the LC circuit be within +/−5% of a target frequency. Accordingly, automatic calibration circuit 104 may be configured to compare the actual LC frequency of PCB 102 with a reference frequency, and to adjust the capacitance to be applied to the LC circuit accordingly.

In one example, automatic calibration circuit 104 may be configured to adjust the LC frequency of PCB 102 by changing an effective capacitance of the LC circuit of PCB 102 with varying capacitances so as to cause a spectrum of frequency responses in the LC circuit of PCB 102. This may be performed independently of whether or not automatic calibration circuit 104 is enabled to compare the actual LC frequency of PCB 102 with a reference frequency, and to adjust the capacitance to be applied to the LC circuit accordingly.

Automatic calibration circuit 104 may be implemented in any suitable manner. Automatic calibration circuit 104 may include analog circuity, digital circuitry, instructions for execution by a processor, or any suitable combination thereof. For example, automatic calibration circuit 104 may include an adjustment circuit 110 and a variable capacitor 108. In another example, automatic calibration circuit 104 may include a spectrum circuit 134.

Adjustment circuit 110 may include a buffer 126, a reference clock 128 or an input from reference clock 128, a frequency comparator 130, and an up/down counter 132. Adjustment circuit 110 may receive input from an output of PCB 102 through interface 106 that includes a signal with the LC frequency. Adjustment circuit 110 may provide any suitable adjustment signal such as a count to spectrum circuit 134.

Spectrum circuit 134 may include a spread spectrum generation circuit 138 and a summer 136. Summer 134 may be configured to receive the count from adjustment circuit 110 or any other suitable source and to add it to output from spread spectrum generation circuit 138. The result may be an adjusted count that is provided to variable capacitor 108.

Variable capacitor 108 may be configured to provide a corresponding capacitance. Variable capacitor 108 may be connected in parallel through interface 106 to CPCB 112, and thus augment the effective capacitance of the LC circuit of PCB 102.

Buffer 126, reference clock 128, frequency comparator 130, up/down counter 132, variable capacitor 108, summer 136, and spread spectrum generation circuit 138 may be implemented by analog circuity, digital circuitry, instructions for execution by a processor, or any suitable combination thereof.

Buffer 126 may be configured to normalize an output signal from PCB 102 and the LC circuit therein. The output signal may be communicated through interface 106. The output signal may be normalized so that it may be compared against a reference frequency. For example, buffer 126 may convert the output signal from PCB 102 into a square wave. Buffer 126 may be implemented as, for example, a non-inverting Schmitt trigger.

A reference frequency may be provided in any suitable manner. For example, reference clock 128 may be a square wave of an expected frequency for the LC circuit. In another example, reference clock 128 may have a frequency that is a sufficient multiple of possible values of the frequency for the LC circuit such that frequency comparator 130 may accurately measure the frequency of the LC circuit. The reference frequency may be stored in, for example, a register.

The reference frequency and the frequency of LC circuit of PCB 102 may be compared by frequency comparator 130. Reference clock 128 may be used as a baseline to count a number of periods or signal transitions in the generated square wave from buffer 126. The number of periods or signal transitions in the generated square wave may be evaluated in view of an expected number of wave periods or signal transitions, given the reference clock 128 and the reference frequency.

Frequency comparator 130 may be configured to compare the frequencies of reference clock 128 and the frequency of LC circuit of PCB 102 and provide any suitable indication of which is greater. For example, frequency comparator 130 may be configured to issue a "1" or logic high output if the frequency of reference clock 128 is less than the frequency of the LC circuit of PCB 102. Frequency comparator 130 may be configured to issue a "0" or logic low output if the frequency of reference clock is greater than the frequency of the LC circuit of PCB 102. The output may be provided to up/down counter 132.

For a given output from frequency comparator 130, up/down counter 132 may be configured to add to or subtract from a running count. The count of up/down counter 132 may be quantification of an adjustment for the capacitance of variable capacitor 108. This count may be based upon the comparison of the frequency of the LC circuit and the reference frequency.

In one example, the count of up/down counter 132 may be further adjusted by spectrum circuit 134 to yield an adjusted count. In another example, adjustment circuit 110 might be omitted, and spectrum circuit 134 may be configured to generate the adjusted count based upon a base reference value stored in, for example, memory or fuses, added to output of spread spectrum generation circuit 138. In such an example, the base reference value may correspond to an expected or previously used value that corresponds to capacitance to be used with PCB 102.

The adjusted count may be provided to variable capacitor 108 to adjust the capacitance value thereof. The adjusted count may be used to set a corresponding capacitance within a possible range of capacitance values of variable capacitor 108. For example, up/down counter 132 may be a 12-bit counter, and capable of producing 4,096 different values. Spectrum circuit 134 may be configured to alter or adjust the specific values from up/down counter 132, while still producing 4,096 possible different values. Variable capacitor 108 may have an input range of 4,096 different values, corresponding to 4,096 different possible capacitance values within its output range. For example, variable capacitor 108 may have a range of 0.0 to 5.0 nF. Thus, each incremental value output from up/down counter 132 as altered by spectrum circuit 134 and provided to variable capacitor 108 may change the capacitance of variable capacitor 108 by 0.00122 nF.

The initial count of up/down counter 132 may be set to a value corresponding to an expected capacitance of variable capacitor 108 so as to cause the frequency of the LC circuit of PCB 102 to match an expected frequency. This initial count may be stored from a manufacturing or validation test, a previous use of system 100, user input, or any other suitable source. Similarly, wherein adjustment circuit 110 might be omitted, a reference value may be used within spectrum circuit 134 to be added by summer 136 to output of spread spectrum generation circuit 138. In this example, the reference value may be set to a value corresponding to an expected capacitance of variable capacitor 108 so as to cause the frequency of the LC circuit of PCB 102 to match an expected frequency.

Upon a determination that the frequency of the LC circuit of PCB 102 is less than the reference frequency, up/down counter 132 may be incremented. The increment may be of any suitable granularity, such as by a count of one. If otherwise unaltered by spectrum circuit 134, the increased count may adjust the capacitance of variable capacitor 108. If otherwise unaltered by spectrum circuit 134, the increased count may cause variable capacitor 108 to increase the capacitance of variable capacitor 108. This increased capacitance may increase the effective capacitance of the LC circuit of PCB 102. This increased capacitance may effectively adjust the on-board capacitance of CPCB 112. This increased effective capacitance may decrease the frequency of the LC circuit of PCB 102. Accordingly, variable capacitor 108 may be configured to adjust the effective capacitance of the LC circuit of PCB 102 based upon the quantification—the count or adjusted count—provided by up/down counter 132 through spectrum circuit 134 and possibly altered by spectrum circuit 134, reflecting the adjustment for the capacitance of variable capacitor 108.

Similarly, upon a determination that the frequency of the LC circuit of PCB 102 is greater than the reference frequency, up/down counter 132 may be decremented. The decrement may be of any suitable granularity, such as by a count of one. If otherwise unaltered by spectrum circuit 134, the decreased count may adjust the capacitance of variable capacitor 108. If otherwise unaltered by spectrum circuit 134, the decreased count may cause variable capacitor 108 to decrease the capacitance of variable capacitor 108. This decreased capacitance may decrease the effective capacitance of the LC circuit of PCB 102. This decreased effective capacitance may effectively adjust the on-board capacitance of CPCB 112. This decreased effective capacitance may increase the frequency of the LC circuit of PCB 102. Accordingly, variable capacitor 108 may be configured to adjust the effective capacitance of the LC circuit of PCB 102 based upon the quantification—the count or adjusted count—provided by up/down counter 132 through spectrum circuit 134 and possibly altered by spectrum circuit 134, reflecting the adjustment for the capacitance of variable capacitor 108.

The comparison of frequencies from the LC circuit of PCB 102 and the reference frequency may continue for any suitable period or under any suitable criteria. The adjustment, up or down, of the capacitance of variable capacitor 108 may reach a stasis or relatively stable state. This may be determined by, for example, whether the output of up/down counter 132 remains within a defined range. In another example, the comparison of frequencies from the LC circuit of PCB 102 and the reference frequency may continue for a determined number of cycles, which would be sufficient to scan through all possible capacitance values of variable capacitor 108.

In some examples, if a difference between the frequencies from the LC circuit of PCB 102 and the reference frequency are sufficiently large, then the count output from up/down counter 132 may be made in multiples, such as by counts of two, four, or eight.

Spectrum circuit 134 may be configured to adjust the count from up/down counter 132 or to adjust a reference value to yield the adjusted count in any suitable manner. As discussed above, spectrum circuit 134 may be configured to add an output from spread spectrum generation circuit 138 to the count from up/down counter 132 or to a reference value. In one example, spread spectrum generation circuit 138 may be configured to provide a range of output values that vary over time. This variation of output, when added to the count or the reference value to yield the adjusted count, may cause corresponding variations in the capacitance of variable capacitor 108. This may change the effective capacitance of the LC circuit of PCB 102. In turn, this may cause variation in the LC frequency of PCB 102. This variation in the LC frequency may operate to reduce the effect of EMI.

Accordingly, any suitable pattern of data may be generated by spread spectrum generation circuit 138. In one example, spread spectrum generation circuit 138 may generate random or pseudo-random numbers. This may be performed, for example, by a pseudo-random binary sequence generator configured to apply Fibonacci polynomials and linear-feedback shift registers. In another example, spread spectrum generation circuit 138 may be configured to generate patterns that vary according to ramp functions, triangle functions, sawtooth functions, sinusoidal functions, or any other periodic function. In yet another example, spread spectrum generation circuit 138 may be configured to generate patterns that vary according spreading above a setpoint in up-spreading, below a setpoint in down-spreading, or around a setpoint in center-spreading. Spread spectrum generation circuit 138 may utilize any suitable system clock to generate a pattern of data.

Figure 2:
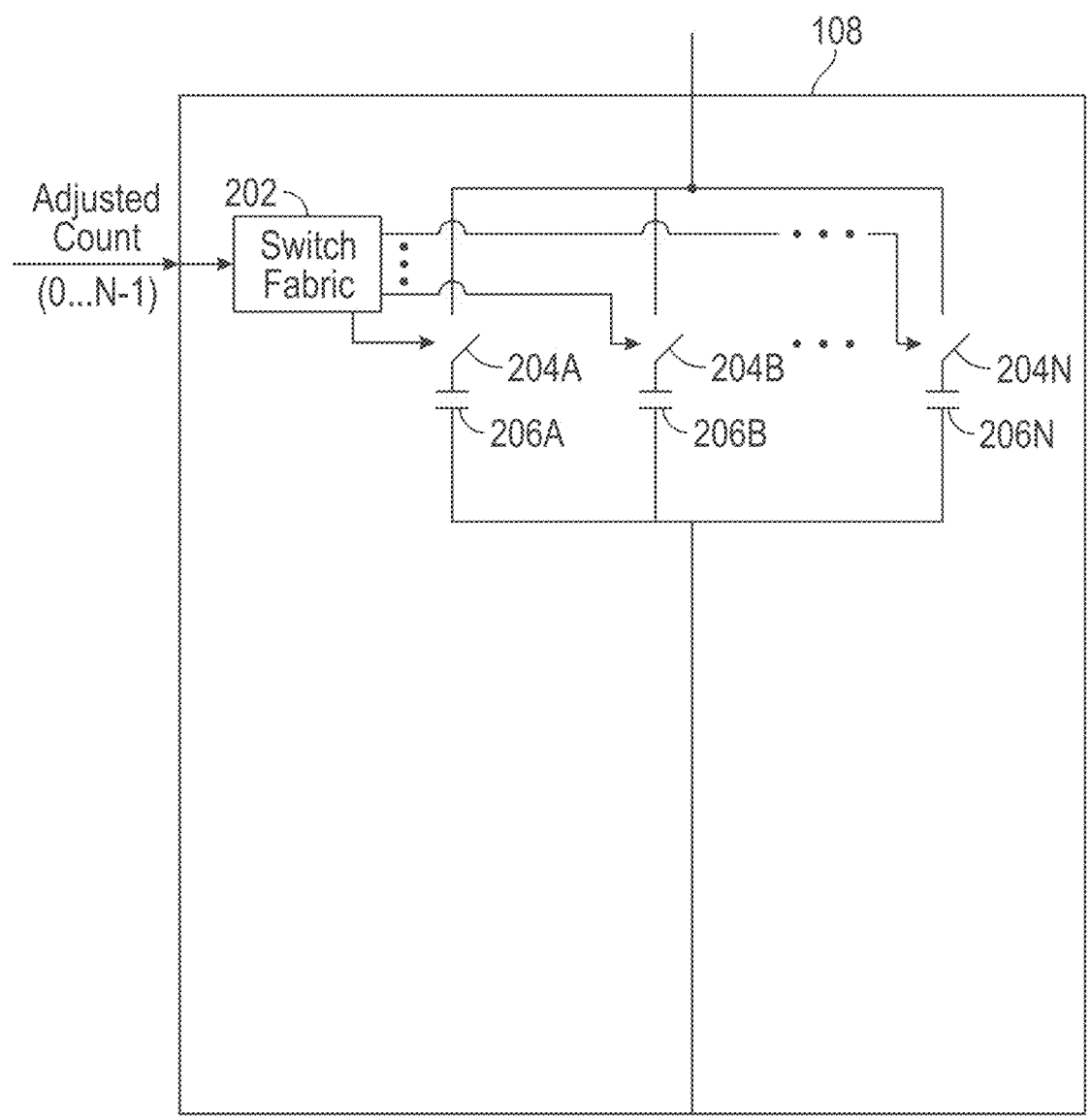
FIG. 2 is a detailed implementation of a variable capacitor, according to examples of the present disclosure.

FIG. 2 is a more detailed implementation of variable capacitor 108, according to examples of the present disclosure. Here, variable capacitor 108 is shown as implemented by an array of capacitors 206. Any suitable number of capacitors 206 may be used, such as N. Capacitors 206 may be arranged in parallel with respect to one another. The adjusted count may be used to selectively enable branches of capacitors 206 arranged in parallel. In the example of FIG. 2, each capacitor 206 might be of a same capacitance, though any suitable combination or number of capacitors of varying sizes can be used. The adjusted count may be represented in binary and translated by control logic or switch fabric 202 to enable or disable the different branches of capacitors 206 in parallel. For example, each branch of a capacitor 206 may be enabled or disabled with a corresponding switch 204. The total capacitance of variable capacitor 108 may be the sum of the capacitances of all the individual capacitors 206 that are enabled at a given time.

Thus, capacitors 206 might be enabled or disabled one-by-one, or in larger groups, until a stable condition is met, or a time period is expired. The capacitance applied by variable capacitor 108 to the effective capacitance of the LC circuit of PCB 102 may approximate a capacitance that in turn approximates a desired frequency of the LC circuit of PCB 102.

Figure 3:
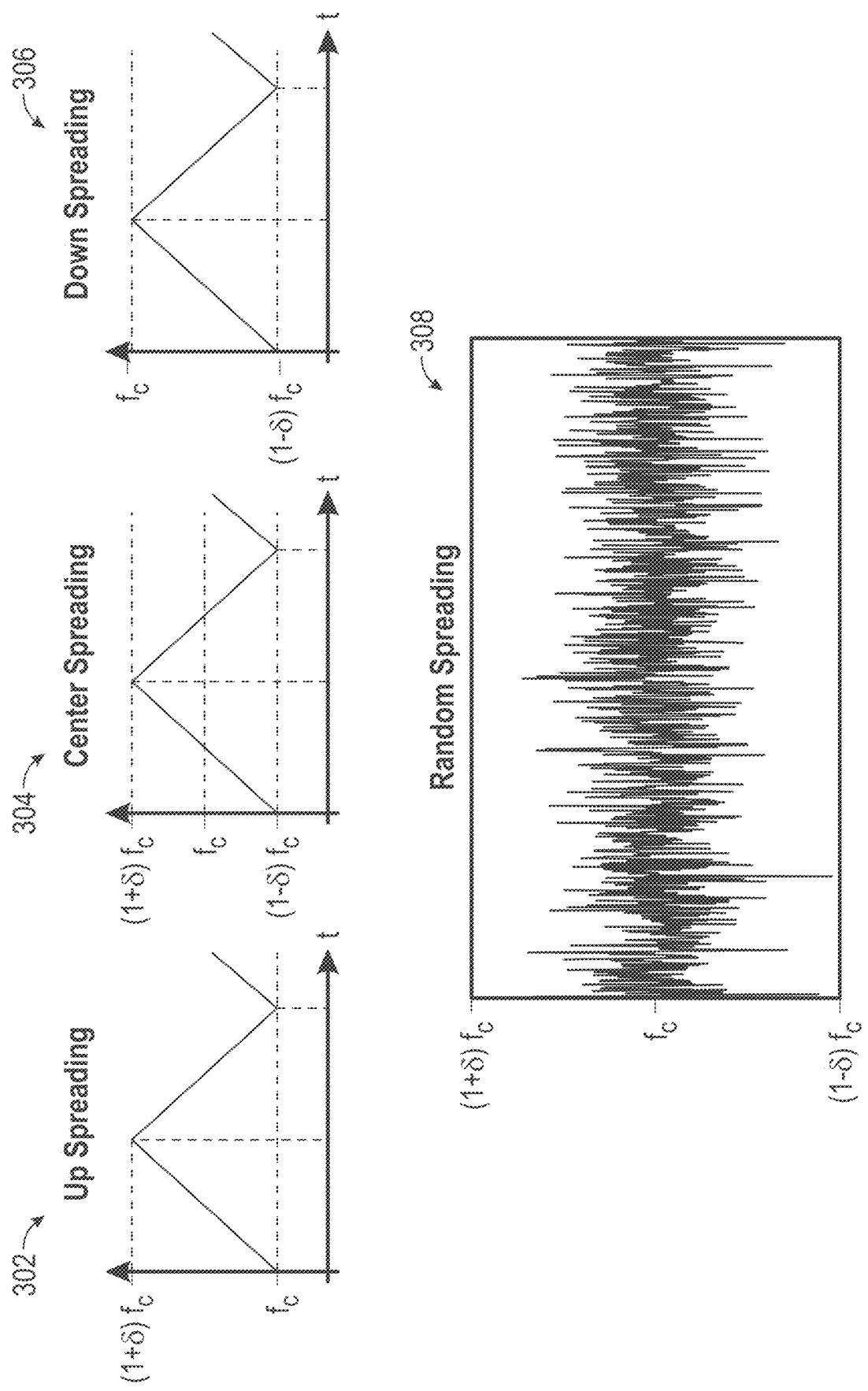
FIG. 3 is an illustration of example frequency spectrums of an LC circuit caused by different outputs of a spread spectrum generation circuit, according to examples of the present disclosure.

FIG. 3 is an illustration of example frequency spectrums of the LC circuit of PCB 102 caused by different outputs of spread spectrum generation circuit 138, according to examples of the present disclosure.

Graph 302 is an example of up spreading. In producing up spreading, spread spectrum generation circuit 138 may be configured to cause variation in capacitance through altered values of the adjusted count such that the resultant LC frequency of PCB 102 varies periodically. Over a cycle of this variation, the frequency may rise above a base frequency $f_c$ to a level of $(1+\delta)$ times the base frequency $f_c$ before returning to the base frequency $f_c$. The rise and fall may be performed according to a triangle function, although other functions might be used.

Graph 304 is an example of center spreading. In producing center spreading, spread spectrum generation circuit 138 may be configured to cause variation in capacitance through altered values of the adjusted count such that the resultant LC frequency of PCB 102 varies periodically. Over a cycle of this variation, the frequency may rise above a base frequency $f_c$ to a level of $(1+\delta)$ times the base frequency $f_c$, return to the base frequency $f_c$, fall below the base frequency $f_c$ to a level of $(1-\delta)$ times the base frequency $f_c$, and then return to the base frequency $f_c$. The rise and fall may be performed according to a triangle function, although other functions might be used.

Graph 306 is an example of down spreading. In producing down spreading, spread spectrum generation circuit 138 may be configured to cause variation in capacitance through altered values of the adjusted count such that the resultant LC frequency of PCB 102 varies periodically. Over a cycle of this variation, the frequency may fall below a base frequency $f_c$ to a level of $(1-\delta)$ times the base frequency $f_c$ before returning to the base frequency $f_c$. The fall and rise may be performed according to a triangle function, although other functions might be used.

Graph 308 is an example of random spreading. In producing random spreading, spread spectrum generation circuit 138 may be configured to cause variation in capacitance through altered values of the adjusted count such that the resultant LC frequency of PCB 102 varies randomly or pseudo-randomly. Over a cycle of this variation, the frequency may be a random value between a level of $(1+\delta)$ times the base frequency $f_c$ and a level of $(1-\delta)$ times the base frequency $f_c$. The distribution of random values in the range of $+/-(1-\delta)$ times the base frequency $f_c$ may be of any suitable distribution.

Figure 4:
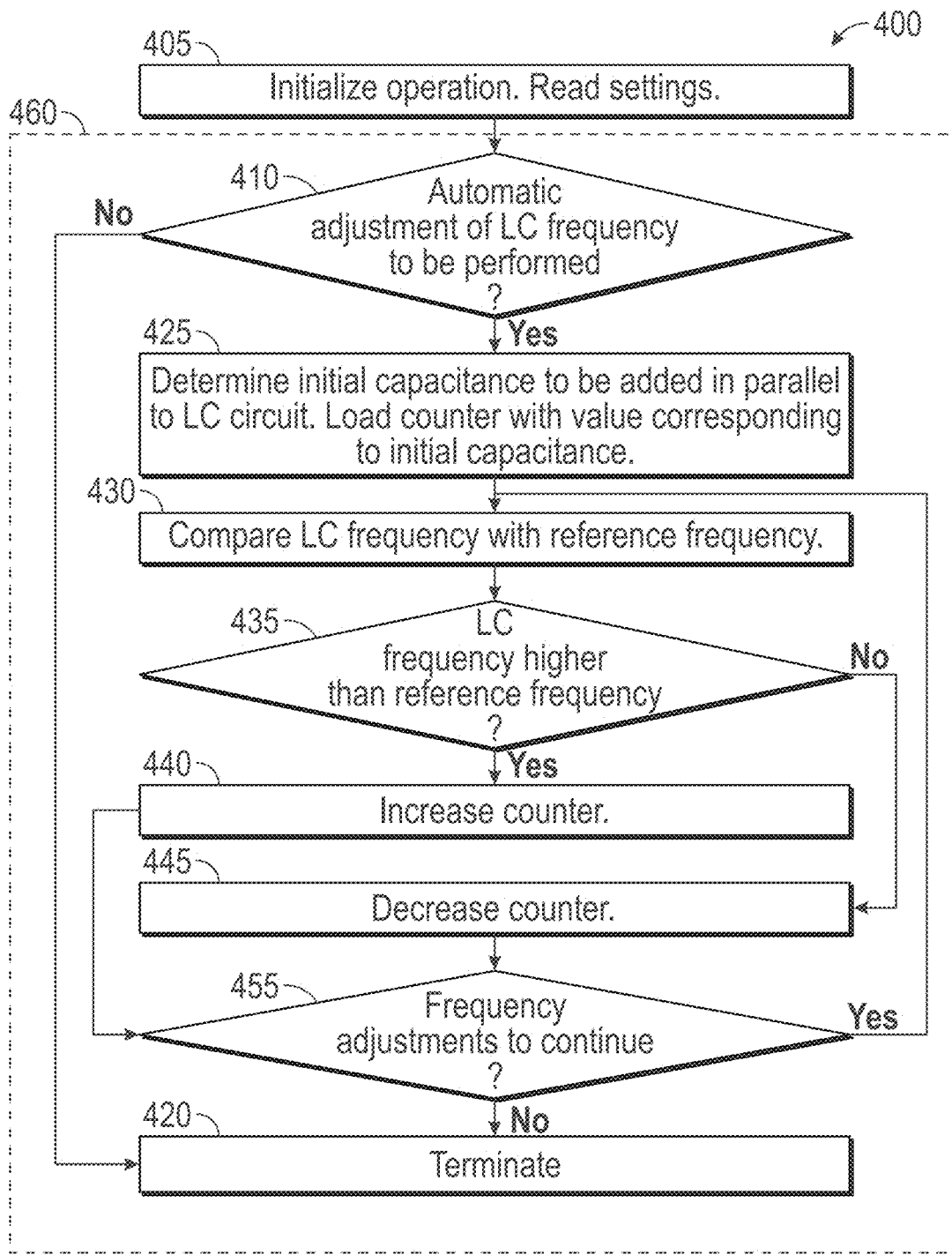
FIG. 4 is an illustration of a method for trimming the capacitance of a PCB-based LC circuit, according to examples of the present disclosure.

FIG. 4 is an illustration of a method 400 for automatic trimming of a PCB-based LC circuit, according to examples of the present disclosure.

Method 400 may be implemented by any suitable system, such as the system and components illustrated in FIGS. 1-3. In particular, method 400 may be implemented by adjustment circuit 110 and variable capacitor 108. Method 400 may include more or fewer blocks than shown in FIG. 4. The blocks of method 400 may be optionally repeated, omitted, or performed in any suitable order. Multiple instances of method 400 may be performed in parallel or recursively. Moreover, various blocks of method 400 may be performed in parallel or recursively. Method 400 may begin at any suitable block, such as block 405.

At block 405, operation may be initialized. Settings may be read. The settings may include, for example, a basis on which frequencies will be evaluated, a reference frequency, or other suitable operational parameters. The method may proceed to an automatic adjustment subroutine 460.

At block 410, it may be determined whether automatic adjustment of the LC frequency of a PCB is to be performed. This may be determined on the basis of, for example, user demand, start-up of a system, periodically, or upon any suitable other criteria. If automatic adjustment of the LC frequency of the PCB is to be performed, method 400 may proceed to block 425. Otherwise, method 400 may proceed to block 415.

At block 415, it may be determined whether method 400 is to repeat. If so, method 400 may return to block 410. Otherwise, method 400 may terminate at block 420.

At block 425, an initial capacitance to be added in parallel to an LC circuit of the PCB may be determined. This may be based upon a last value used during operation of block 400, or a designated initial value for startup of a system for which method 400 is performed. A counter value corresponding to this initial capacitance may be determined and loaded into a counter, such as an up/down counter.

At block 430, the LC frequency from the PCB may be compared with a reference frequency. At block 435, it may be determined if the LC frequency from the PCB is higher than the reference frequency. If so, method 400 may proceed to block 440. If not, method 400 may proceed to block 445.

At block 440, the counter may be increased or incremented so as to increase a variable capacitance of a variable capacitor to be applied to the LC circuit. This may have the effect of decreasing the LC frequency of the PCB. Method 400 may proceed to block 455.

At block 445, the counter may be decreased or decremented so as to decrease the variable capacitance of the variable capacitor to be applied to the LC circuit. This may have the effect of raising the LC frequency of the PCB. Method 400 may proceed to block 455.

At block 455, it may be determined whether frequency adjustments are to continue. This may be performed on any suitable basis. For example, the frequency adjustments may end after the counter has been incremented and decremented in succession, thus signaling that further adjustment of the variable capacitor may not completely eliminate the difference between the reference frequency and the LC frequency. In another example, the frequency adjustments may be made in a fixed number of iterations. If frequency adjustments are to continue, method 400 may return to block 430. In some examples, automatic adjustment subroutine 460 may be repeated based on a temporal, environmental, or manual trigger. For example, a timer may trigger automatic adjustment after a period of hours. In another example, changes in temperature beyond a threshold may trigger an automatic adjustment. In yet another example, a manual input may trigger an automatic adjustment.

Figure 5:
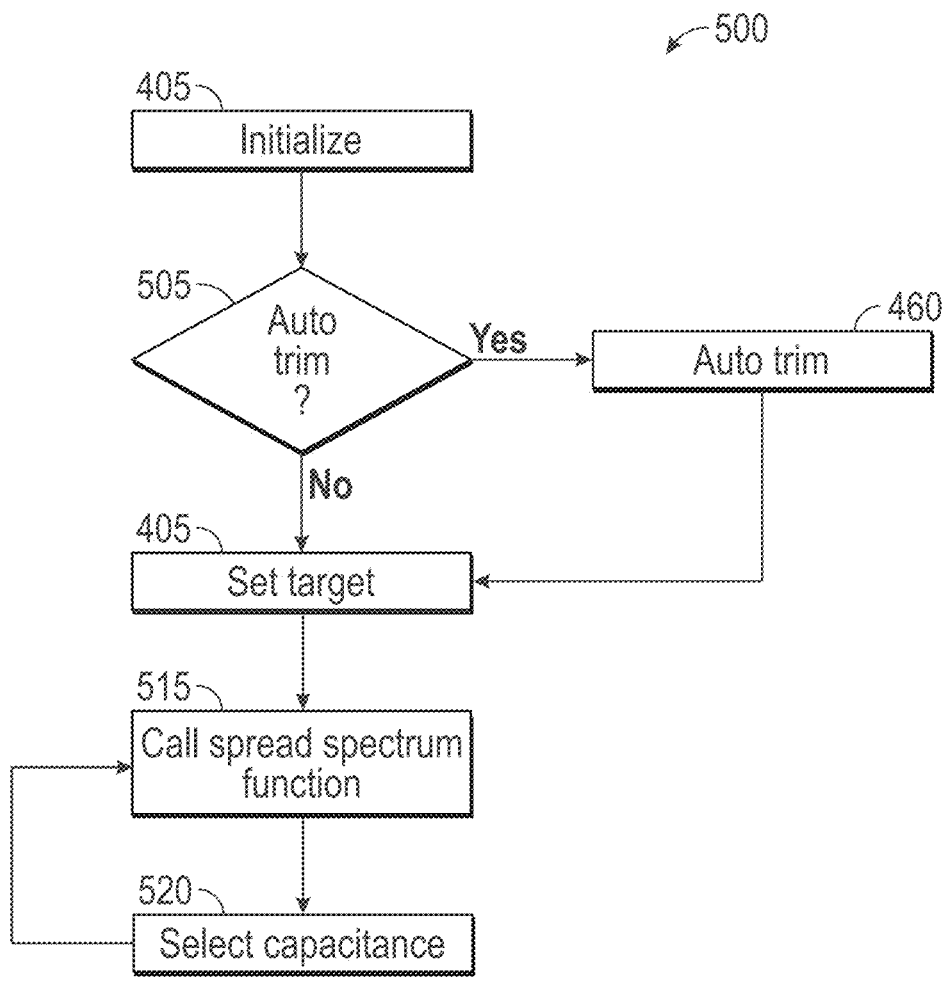
FIG. 5 is an illustration of a method for adjusting the capacitance of a PCB-based LC circuit, according to examples of the present disclosure.

FIG. 5 is an illustration of method 500 for adjusting the capacitance of a PCB-based LC circuit, according to examples of the present disclosure.

Method 500 may be implemented by any suitable system, such as the system and components illustrated in FIGS. 1-3. In particular, method 500 may be implemented by adjustment circuits 110 and 134 along with variable capacitor 108. Method 500 may include more or fewer blocks than shown in FIG. 5. The blocks of method 500 may be optionally repeated, omitted, or performed in any suitable order. Multiple instances of method 500 may be performed in parallel or recursively. Moreover, various blocks of method 500 may be performed in parallel or recursively. Method 500 may begin at any suitable block, such as block 405.

At block 405, operation may be initialized. Settings may be read. The settings may include, for example, a basis on which frequencies will be evaluated, a reference frequency, or other suitable operational parameters. In one example, the settings may define what functions are to be used by spread spectrum generation in block 515.

At block 505, it may be determined whether automatic adjustment of the LC frequency of a PCB is to be performed. This may be determined on the basis of, for example, user demand, start-up of a system, periodically, or upon any suitable other criteria. If automatic adjustment of the LC frequency of the PCB is to be performed, method 500 may proceed to block 460. Otherwise, method 500 may proceed to block 510.

At block 510, a target capacitance may be determined. If automatic adjustment was performed, the target may be set to the automatically adjusted value. Otherwise, the target value may be set to a default value as read from settings in block 405. The default value may be set to half the available capacitance of variable capacitor.

At block 515, a call is made to a spread spectrum function such as spread spectrum function 138 to obtain an adjustment value. Any suitable function, such as up spreading, down spreading, center spreading, random spreading, triangle functions, periodic functions, sawtooth functions, or sinusoidal functions. The adjustment value may be further adjusted at block 515 based on the target capacitance to ensure the sum of the target value and the adjustment value remain within the bounds of possible capacitance of variable capacitor 108. In an example, variable capacitor 108 may have 128 possible levels of capacitance. If the target capacitance is set to the lowest level (i.e., the zero index) and the output of the spread spectrum function is −10 in a range of −64 to 64, the adjustment value may be set to 54 thereby centering the spread spectrum function at the midpoint of available variable capacitance. In another example based on the same target and output range of the spread spectrum function, the adjustment may be set to the absolute value of the spread spectrum value, thereby deviating less from the target capacitance.

At block 520, the target value and adjustment value are summed to produce a setting for the variable capacitor and the variable capacitor is adjusted accordingly.

The method returns to block 515 at a predefined interval in a continuous adjustment process to vary the capacitance of variable capacitor 108.

Although examples have been described above, other variations and examples may be made from this disclosure without departing from the spirit and scope of these examples.

What is claimed is:

1. A controller for controlling a capacitance of an LC circuit having a circuit frequency, comprising:
   a variable capacitor to couple with an external inductor as part of an LC circuit;
   a target value;
   a spread spectrum function to generate an adjustment value;
   a circuit to poll the target value, call the spread spectrum function, and set a capacitance of the variable capacitor based on the sum of the target value and the adjustment value; and
   an adjustment circuit including a frequency comparator circuit to compare a frequency of the LC circuit against a reference frequency and adjust the target value based upon the comparison between the LC circuit frequency and the reference frequency.

2. The controller of claim 1, wherein the spread spectrum function is a random or pseudo random number generator.

3. The controller of claim 1,
   wherein the adjustment circuit increases the target value when the LC circuit frequency is higher than the reference frequency, and
   decreases the target value when the LC circuit frequency is lower than the reference frequency.

4. The controller of claim 3, wherein the spread spectrum function is a random or pseudo random number generator.

5. The controller of claim 1, wherein the spread spectrum function is one of: a ramp function, a triangle function, a sawtooth function, and a sinusoidal function.

6. The controller of claim 1, wherein the spread spectrum function is one of: spreading above a setpoint in up-spreading, below a setpoint in down-spreading, and around a setpoint in center-spreading.

7. The controller of claim 1, wherein the LC circuit includes a proximity/position detection sensor.

8. A method of trimming a capacitance, comprising:
   providing a variable capacitance in an integrated circuit coupled to leads for coupling to, and in parallel with, an external inductor as part of an LC circuit,
   setting a target value for the variable capacitance,
   on a regular interval, determining an adjustment value from a spread spectrum function,
   setting the variable capacitance based on the sum of the target value and the adjustment value,
   comparing a frequency of the LC circuit against a reference frequency, and
   adjusting the target value based upon the comparison between the LC circuit frequency and the reference frequency.

9. The method of claim 8, wherein setting the target value comprises:
   increasing the target value when the LC circuit frequency is higher than a reference frequency, and
   decreasing the target value when the LC circuit frequency is lower than the reference frequency.

10. The method of claim 9, comprising terminating setting the target value after both increasing and decreasing the target value.

11. The method of claim 9, wherein setting the variable capacitance comprises using the sum of the target value and the adjustment value to select a number of capacitors to combine to form a capacitor with the target capacitance.

12. The method of claim 9, wherein the spread spectrum function is one of: a ramp function, a triangle function, a sawtooth function, and a sinusoidal function.

13. The method of claim 9, wherein the spread spectrum function is one of: spreading above a setpoint in up-spreading, below a setpoint in down-spreading, and around a setpoint in center-spreading.

14. The method of claim 8, wherein the spread spectrum function generates a random or pseudo random number in a range such that adding the output of the spread spectrum function to the target value remains within a minimum and a maximum quantum of available variable capacitance.

15. The method of claim 8, wherein the LC circuit includes a proximity/position detection sensor.

16. A circuit comprising:
   an LC circuit comprising:
     an inductor; and
     a capacitor, and
   a controller coupled to the LC circuit for controlling a capacitance of the LC circuit having a circuit frequency, the controller comprising:
     a variable capacitor to couple with the LC circuit;
     a target value;
     a spread spectrum function to generate an adjustment value;
     a circuit to poll the target value, call the spread spectrum function, and set a capacitance of the variable capacitor based on the sum of the target value and the adjustment value; and
     an adjustment circuit including a frequency comparator circuit to compare a frequency of the LC circuit frequency against a reference frequency and adjust the target value based upon the comparison between the LC circuit frequency and the reference frequency.

17. The circuit of claim 16, wherein the spread spectrum function is a random or pseudo random number generator.

18. The circuit of claim 16, wherein the adjustment circuit increases the target value when the LC circuit frequency is higher than the reference frequency, and
    decreases the target value when the LC circuit frequency is lower than the reference frequency.

19. The circuit of claim 16, wherein the spread spectrum function is one of: a ramp function, a triangle function, a sawtooth function, and a sinusoidal function.

* * * * *